March 14, 1967 R. W. REICH 3,309,590
MAGNETIC IMPELLING SYSTEM FOR MECHANICAL OSCILLATORS
Original Filed March 31, 1961 2 Sheets-Sheet 1
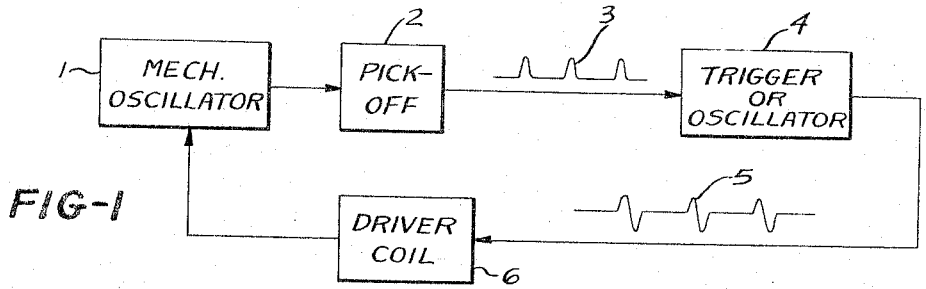
FIG-1
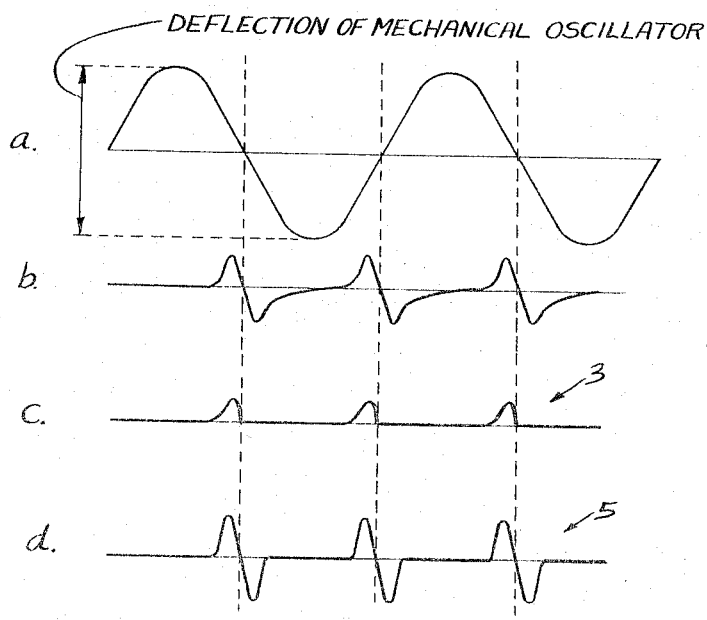
FIG-8
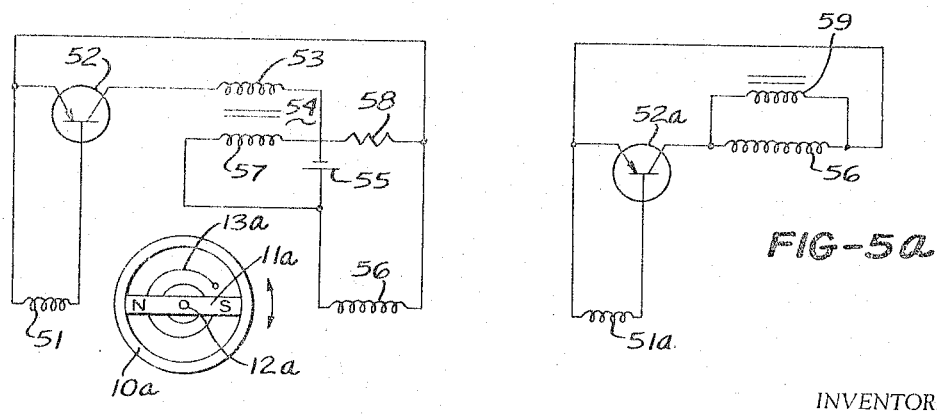
FIG-5
FIG-5a
INVENTOR.
ROBERT WALTER REICH
BY March 14, 1967 R. W. REICH 3,309,590
MAGNETIC IMPELLING SYSTEM FOR MECHANICAL OSCILLATORS
Original Filed March 31, 1961 2 Sheets-Sheet 2
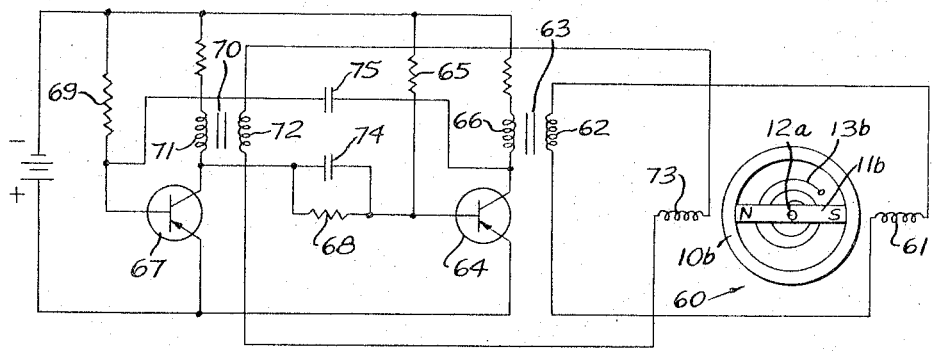
FIG-6
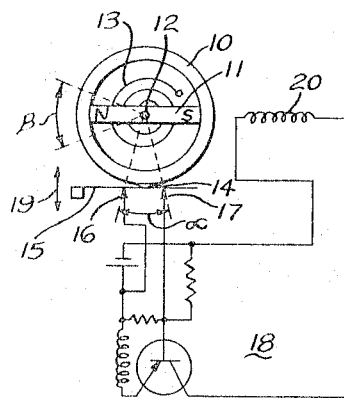
FIG-2
FIG-3
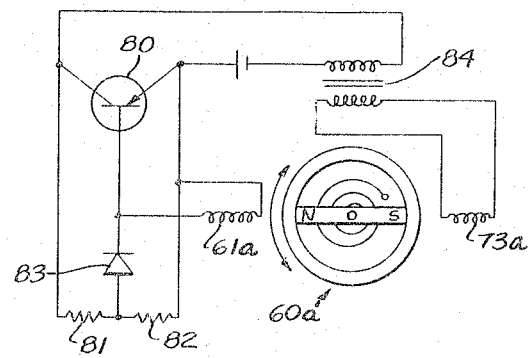
FIG-7
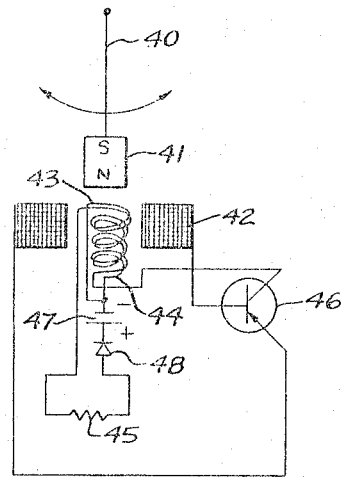
FIG-4
INVENTOR.
ROBERT WALTER REICH
BY United States Patent Office 3,309,590
Patented Mar. 14, 1967

3,309,590
MAGNETIC IMPELLING SYSTEM FOR
MECHANICAL OSCILLATORS
Robert Walter Reich, Merzhauserstr. 143,
Freiburg im Breisgau, Germany
Original application Mar. 31, 1961, Ser. No. 99,940, now
Patent No. 3,221,231, dated Nov. 30, 1965. Divided
and this application Sept. 20, 1965, Ser. No. 488,376
7 Claims. (Cl. 318—128)

The present invention relates to a magnetic impelling system for a mechanical oscillator such as a pendulum or a balance wheel as used in clocks and watches, and is a division of my copending application Serial No. 99,940, now Patent No. 3,221,231.

More particularly, the invention relates to an electric or electronic impelling system for mechanical oscillators of the type as stated above.

The availability of small pellet type batteries has brought about recently attempts to provide electronically controlled impelling systems for even small watches. The improved reliability of electronic components also initiated a development for similar impelling systems for larger clocks.

The known or recently suggested impelling systems usually employ a permanent magnet oscillating with the oscillating mass; a stationary pick-up coil senses the position of the permanent magnet whereby a voltage is induced in such coil; in a driver coil magnetic impelling pulses are produced effecting the permanent magnet thus impelling the oscillator; a control circuit of some kind interconnects the pick-up coil and the driver coil feeding current to the latter in response to the induced voltage in the former.

The main problems encountered are the necessary miniaturization of the control circuit on one hand, and, on the other hand, the inherently directional insensitivity of the pick-up coil and the requirement of having the polarity of the impelling pulse in the driver coil synchronized with the pendulum. The presently known systems tried to solve these problems in limiting the impelling action to one short impelling pulse during one complete cycle of the oscillator.

Even this type of known device does not completely prevent the appearance at times during the oscillation cycle of a blocking or retarding pulse in the driver coil, hampering instead of impelling the oscillator. The substitution of a contact control device and a supplemental voltage source in lieu of the pick-up coil has not altered this disadvantage.

One of the main reasons of the production of such blocking pulse is to be seen in the effect of the leakage current in diodes and transistors employed as control elements in the control circuit for the driver coil. Though the blocking or retarding pulses are smaller than the impelling pulses, the mere existence of such hampering action is a waste of power to be avoided for an efficient miniaturization.

It is an object of the present invention to provide for a new and improved electronic-magnetic impelling system for a mechanical oscillator of the type mentioned above, in which system no blocking or retarding pulses are produced in the driver coil.

It is a feature of the present invention to provide an electronically controlled impelling system for a mechanical oscillator in which up to four impelling pulses appear during each cycle of the oscillations.

According to one aspect of the present invention in a preferred embodiment thereof it is a primary feature of the present invention to provide a permanent magnet oscillating with a mechanical oscillator, a stationary driver coil is disposed so as to be in magnetic coupling relationship with the magnet; the magnet approaches and recedes the magnetic field range of the coil; and electronic-semi-conductor-control circuit is connected to this driver coil for supplying current pulses thereto which current pulses change polarity precisely when the magnet changes from approach to receding or vice-versa as defined above so that two succeeding magnetic impelling pulses are produced; the control loop is closed by a position sensing device being either a cam controlled switching system or a stationary pick-up coil responsive to the approach and receding of the magnet and producing activating pulses as input signals for the control circuit.

At this instant proper terminology to be used in this specification is to be defined. In the following, zero position of the oscillator and of the magnet oscillating therewith, is to be a position in which the oscillator alters the sense of direction of its movement with respect to the axis being also the magnetic axis of the driver coil; this zero position separates the approach of the axis of the permanent magnet on the balance wheel to the axis of the driver coil from the receding therefrom or vice-versa. This thus defined zero position is not necessarily the zero position of the oscillator itself defined as the center between the two extreme deflection-amplitudes. These two zero positions, however, will preferably coincide for reasons of balance if used to separate an approaching movement from a succeeding receding movement. In case of such coincidence, the zero position as defined will be when the magnet passes through or is closest to the magnetic axis of the coil while the oscillator has its lowest level of potential energy.

Alternatively, the zero position as defined as separating receding from a succeeding approach with respect to the coil may be the return point of the oscillator (maximum level of potential energy). Therefore, zero position can be any or all of the return points of the oscillator and/or any or all of the zero position of the oscillator from standpoint of the oscillation.

While the specification concludes with claims particularly pointing out and distinctly claiming the subject matter which is regarded as the invention, it is believed that the invention, the object and features of the invention and further objects, features and advantages thereof will be better understood from the following description taken in connection with the accompanying drawing in which:

FIGURE 1 illustrates in a block circuit diagram the principles involved in the present invention, FIGURE 2 is a circuit diagram of a first embodiment of the present invention using a transistor oscillator, FIGURE 3 illustrates in a circuit diagram a modification and simplification of the device shown in FIG. 2 whereby a tunnel diode oscillator is employed, FIGURE 4 illustrates a circuit diagram of another embodiment of the present invention, FIGURES 5 and 5a illustrate two improved modifications of the device shown in FIG. 4, FIGURE 6 illustrates a circuit diagram, a further embodiment of the present invention utilizing a transistorized univibrator as control element, FIGURE 7 illustrates in a circuit diagram a simplifying modification of the device shown in FIG. 6, and FIGURE 8 illustrates graphs showing the effect of several embodiments of the present invention. As related to FIGURE 1, (*b*) is the pick-off voltage wave form, (*c*) is the train of unipolar pulses 3, and (*d*) is the train of pulses produced. Relating FIGURE 8 to FIGURE 5, (*b*) represents the wave form of 51, (*c*) represents the pulse of 53, and (*d*) represents the pulses of 57.

Turning first to FIGURE 1 there is illustrated a block diagram showing, in principle, the layout of a device according to the invention.

Numeral 1 designates a mechanical oscillator such as a balance wheel or a pendulum. There is a sensing element 2 producing a train of unipolar pulses 3, each pulse being produced when the oscillating mass of oscillator 1 approaches a zero position in the meaning as defined above. The pulse train 3 is fed to a trigger or univibrator 4 which is so designed that, upon occurrence of any pulse of train 3, two pulses of opposite polarity are produced preferably following each other directly without a pause in between. The two thus defined pulses need not to have similar amplitude and/or duration, but in the preferred form of contemplating the invention these pulses are similar and differ only in their polarity. Numeral 5 designates this thus produced train of pulses.

It is the main feature of the present invention, that, upon occurrence of a trigger pulse such as in train 3, as oscillation-like pulse-pair, such as in train 5, is produced with a change of polarity coinciding precisely with the zero position of oscillator 1.

The pulse-pair-train 5 is fed to a driver coil or coils and transformed therein into impelling pulses, attracting the oscillating mass towards the magnetic axis of the driver coil and repelling it therefrom after passing it.

In connection with FIG. 8 the operation of the device shown in FIG. 1 shall be explained briefly. FIG. 8a illustrates the relative oscillating postion of the oscillator with respect to the position of driver coil 6. This may for example also be the zero position as defined and also of the oscillating inertia itself. If the pick-off device 2 is a coil being coaxial with the driver coil and in which pick-off coil are induced voltage pulses by a permanent magnet oscillating with the inertia, the voltage in such coil has a shape as shown in FIG. 8b. Only the pulses of one polarity are of interest, therefore FIG. 8c illustrates the train 3. FIG. 8d shows the pulse train 5, being composed of pulses of alternating polarity, with a reversal of such polarity at precisely the zero position.

It can be seen, that four impelling pulses are produced during each cycle.

It should be mentioned, and will be explained in detail in the following, that, in general, the drop to zero of pulses of train 3 need not to coincide with the zero position of the mechanical oscillator as defined.

Turning now to FIG. 2, there is shown a first example illustrating in detail how the invention can be carried out and what particular type of elements can be used with advantage so as to reduce the block diagram of FIG. 1 to practice.

There is first shown a balance wheel 10 supported by a permanent magnet 11 mounted on a pivot 12. There is the usual balance spring 13 rotating with one end with the pivot 12 thereby being compressed and expanded. This is a mechanical oscillator.

The wheel 10 carries a cam 14 operating a spring biased switch 15. The angle α indicates the angular range in which switch 15 is closed by cam 14 overbridging stationary contacts 16 and 17. This angle α, however, is smaller than the angular range β describing the double amplitude of the oscillations carried out by the oscillator. The cam 14 and the switch 15 are so arranged that when cam 14 is in the center of angle α, the oscillator is in its resting position. In other words, switch 15 engages contacts 16 and 17 for a similar time before and after the oscillator passes through zero. It is assumed, in this example, that zero position with respect to the driver coil is also zero position of the oscillator, and this is the momentary position illustrated.

Numeral 18 designates a transistor oscillator, effective as univibrator but actually being of the free running type and being power biased only so long as switch 15 is closed. This transistor oscillator is so designed, that during this closing time one complete oscillation is produced with a passing through zero at precisely the time the mechanical oscillator passes through zero.

The tuning of this transistor oscillator to the mechanical oscillator can simply be carried out in shortening or prolonging the closing time to switch 15 which in turn can simply be carried out in moving the stationary support of resilient switch 15 in the direction of double arrow 19.

One can for example start with a completely off-tune relationship between the two oscillators and then the switching time of switch 15—cam 14 is altered until maximum amplitude of the mechanical oscillator is observed.

The linkage between the two oscillators so as to define a complete loop (see FIG. 1) is given by the driving or driver coil 20 coupled and connected to oscillator 18. In designing and proportioning oscillator 18 one has, of course, to consider the inductance of coil 20.

The two output pulses of opposite polarity constituting one oscillation are fed to this driver coil 20 thus producing two magnetic pulses, being of opposite polarity. These pulses will attract the magnet 11 when approaching the zero position. At zero position the magnetic field produced by coil 20 is reversed and therefore a repelling pulse is produced pushing magnet 11 away from the zero position thus impelling the mechanical oscillator.

Usually in a given electronic oscillator the period of time of the first initiation of a half wave and the passing through zero, is a fixed one. Therefore, in shifting the switching time of switch 15 the passing through zero of the transistor oscillator is shifted and it will be observed, that maximum impelling i.e. maximum amplitude of the mechanical oscillator will only be observed when both the mechanical and the electronic oscillators pass through zero at the same time because only then does the attracting pulse in driver coil 20 operate only during the approach of magnet 11, and only then does the succeeding repelling pulse in driver coil 20 operate only when the magnet 11 recedes.

FIG. 3 illustrates a similar embodiment of the invention. In FIG. 3, parts which are identical with those of FIG. 2 bear the same numerals. A tunnel diode 31 is used to define the negative resistor in a simpler type of oscillator including a variable series resistor 35 and a parallel capacitor 34. There is provided a transformer 32 to couple the driver coil 33 to the oscillator. The operation is similar as outlined with respect to FIG. 2, where cam 14 closes contacts 16 and 17 causing current to flow through the primary of transformed 32. A current is induced in the secondary of transformer 32 and causes a flow of current in coil 33 which corresponds to coil 20 in FIGURE 2. The flow in coil 33 creates a magnetic field which attracts the field of permanent magnet 11 as the cam 14 moves from 17 to zero position. The tunnel diode 31 is a switching device and when cam 14 reaches the zero position, the flow of current is reversed in transformer 32 causing a magnetic field in coil 33 which repulses the permanent magnet 11.

FIG. 4 illustrates another embodiment of the invention. There is first provided a pendulum 40 having a permanent magnet 41 which for reasons of simplicity is assumed to incorporate the oscillating mass; this is the mechanical oscillator in this embodiment.

There is provided a stationary pick-up coil 42 having a center axis coinciding with the magnetic axis of permanent magnet 41 when the pendulum 40 is in or passes through its zero position. Concentrically (and also coaxially) with sensing or pick-up coil 42 is a bifilar coil 43, 44; coil 43 is short-circuited by a resistor 45 and coil 44 is connected in series circuit connection with the emitter-collector path of a transistor 46 and a D.C. voltage source 47. Pick-up coil 42 is connected between base and emitter of this transistor 46. A diode connects voltage source 47 and coil 43 but without the possibility of current flowing from the voltage source to coil 43 or resistor 45.

The device illustrated operates as follows: when magnet 41 swings towards the zero-position, a voltage is induced in coil 42 of such a polarity to negatively bias the base of transistor 46 with respect to the emitter thereof, thus permitting a collector current to flow. The collector current passes through coil 44 producing an attracting magnetic field for magnet 41 thus providing for a first impelling effect in attracting the approaching magnet.

Upon reaching the zero position, the induction produced by magnet 41 in coil 42 is rapidly reduced to zero and changes its polarity thus blocking the transistor 46, cutting off the current through coil 44. By inductance, however, a voltage was indeed induced in coil 43 when the current in coil 44 was cut off; coil 43 being magnetically coupled to coil 44 in a transformer type system.

The current now flowing in coil 43 only produces a magnetic field oppositely directed with respect to the magnetic field existing before.

This magnetic field produced by the current in coil 43 now being effective alone, repels the magnet 41 receding from the zero position, and thus a second impelling action is exerted upon the pendulum.

It will be observed, that in this embodiment, the elements 4 and 6 of FIG. 1 appear as being combined in the coil combination 43, 44 together with the collector-emitter path of transistor 46.

Diode 48 and the connection of resistor 45 to voltage source 47 serves as an energy feed back conduction, so that part of the current through coil 43 is used to return some of the energy flow to the voltage source. If, for example, voltage source 47 is a battery and if the voltage drop across resistor 45 exceeds at times the voltage of such battery, the latter will receive a recharging pulse.

FIG. 5 illustrates another embodiment of the invention. The mechanical oscillator, 10a, 11a, 12a and 13a is similar to that of FIGS. 2 and 3 with the exception that ring 10a has no cam, but there is a stationary pick-up coil 51, having a magnetic axis coinciding with the magnetic axis of magnet 11a when the mechanical oscillator is in zero position.

Coil 51 is connected between base and emitter of a transistor 52, the collector of which being connected in series circuit with the primary winding 53 of a transformer 54, a battery 55 and a driver coil 56; the return connection from the latter leads to the emitter of transistor 52. Coils 56 and 51 are coaxially disposed with respect to each other, and the magnetic axis of the permanent magnet 11a passes through this coil axis in zero oscillating position.

Across driver coil 56 there is connected the secondary 57 of a transformer 54. A resistor 58 is provided to render the secondary circuit of transformer 54 highly ohmic, and it will be understood that secondary 57 and resistor 58 can be combined physically so as to form a high ohmic secondary winding. It is apparent further that this secondary circuit is also part of the emitter circuit of transistor 52.

The operation is similar to the operation of the device shown in FIG. 4. When magnet 11a approaches coil 51 an opening pulse is produced for transistor 52 and a driver pulse is produced by the collector current in coil 56 attracting magnet 11a. When magnet 11a recedes from coil 51, transistor 52 is closed but the collapsing magnetic field as produced by primary 53 in transformer 54 induces a voltage in winding 57 the current of which being, so to speak, out of phase with the collector current before. The voltage in and current through winding 57 is fed to driver coil 56 so that a driver pulse appears therein oppositely directed to the preceeding driver pulse, thus repelling the receding magnet 11a.

The transformer and the secondary circuit of FIG. 5 can be substituted as illustrated by FIG. 5a by a choke 59 with relatively large iron core, serving as magnetic storage element, discharging its energy as driver pulse through coil 56 having a polarity opposite to the polarity of the preceeding charging current pulse. When magnet of the oscillator (not shown in FIG. 5a) approaches coil 51a in FIGURE 5a an opening pulse is produced for transistor 52a and a driver pulse is produced by the collector current in coil 56 attracting the magnet and storing energy in choke 59. When the magnet recedes from coil 51a transistor 52a is closed and energy stored in choke 59 is discharged as a driving pulse through coil 56 with a polarity opposite to the polarity of the opening pulse.

FIG. 6 illustrates a further embodiment of the invention with a monostable trigger circuit network. In this device, the pick-up pulse is not used to keep a transistor open as long as it has a particular polarity, but the pick-up pulse is used to initiate only a complete oscillation.

There is first, again provided, the mechanical oscillator 60 composed of the elements 10b to 13b as described above. There is a driver coil 61 connected to a secondary 62 of a transformer 63 having a primary winding 66 connected to the collector of a first transistor 64 being biased to cut-off position by the resistors 65 and 68, connected to the collector of a second transistor 67, which is base-biased in the on state by a resistor 69. Capacitor 74 connects the collector of transistor 67 to the base of transistor 64. Capacitor 75 connects the collector of transistor 64 to the base of transistor 67. The collector circuit of transistor 67 includes the secondary 71 of a transformer 70 having a primary 72 connected to a pick-up 73.

A pulse built up in coil 71 produces a cut-off voltage in primary 72 renders the base of transistor 67 positive for cut-off thereof whereby transistor 64 flips into the conductive state. The trigger thus flips into its unstable state thereby producing a driver pulse in coil 61 via transformer 63, with transistor 67 being nonconductive. After a period of time determined by the RC values of the collector-to-base circuit from transistor 67 to transistor 64, the trigger flips back into its stable state, which means opening the collector current of transistor 67 appearing as driver pulse of opposite polarity in coil 61.

The trigger circuit is so designed that no leakage current flows beyond the decay after cut-off. Resistors and capacitors are designed so that the flipping back into the stable state is carried out precisely at zero position of the passing of oscillator 60.

The device illustrated in FIG. 7 is an improvement of the one shown in FIG. 6 in that less circuit elements are used.

There is again provided a mechanical oscillator 60a a driver coil 73a and a pick-up coil 61a. There is a transistor 80, biased to cut-off normally, by base bias resistors 81 and 82. There is a diode 83 connected between bias resistors 81 and 82 and the transistor base so as to prevent any flow of current from this base. pick-up coil 61a is connected between and across base and emitter. A transformer 84 is inserted so as to couple the collector circuit of transistor 80 to driver coil 73a.

It will be comprehended, that not any amplitude of a negative voltage induced in coil 61a and appearing at the base will open the transistor 80. The circuit provides resistors 81 and 82 and resistor 82 provides a forward bias for the base emitter input circuit. Thus, the emitter current pulse will have a sharp leading edge producing consequently a sharp driver pulse. The cut-off of the collector current being also the current in the primary of transformer 84, produces an oppositely directed driver pulse in coil 73a; this cut-off, of course, occurs when the magnet of oscillator 60a passes through zero whereby the induced voltage in coil 61a rapidly changes polarity.

There may be a high ohmic resistor inserted in parallel circuit connection to coil 73a, or the latter element may be itself sufficiently high ohmic resistive. This is important because the secondary circuit of transformer 84 shall have a predominantly ohmic load characteristic.

The core of transformer 84 may be a saturable one, with saturation occurring at a voltage well below the battery voltage. In this case the device operates independent of changes in the battery voltage because the driver pulses in coil 73a are produced only during moments of increasing and decreasing collector current energizing the transformer 84.

There is no dependency upon temperature in this circuit design because there is no leakage current through the transistor, being sufficiently biased to below cut-off; the bias as well as the voltage induced in coil 61a is independent of temperature.

It will be comprehended from the foregoing, that the device can be used not only in large size clocks but also in small watches such as wrist watches. The primary advantage is to be seen in the low energy consumption reducing any losses drastically as compared with conventional designs. There are no retarding pulses produced, and every magnetic field appearing in and around any of the driver coils shown impels the oscillator. The particular feature of the invention, using the breakdown of a first magnetic impelling field for the generation of a second field is an important reduction in power loss.

As modification of the embodiments shown in FIGS. 4 and 7, the pick-up coil can be substituted by a contact-cam-voltage source arrangement as disclosed in FIGS. 2 and 3, whereby, however, the opening of the contact has to be precisely at zero position of the mechanical oscillator as defined.

It should be pointed out, that for example the devices shown in FIGS. 2, 3 and 5 to 7 could also be understood as being illustrated at return point of the oscillator, in which case return point of the oscillator and zero position as defined would coincide.

It should further be pointed out that driver and exciter coil do not have to be disposed coaxially in case the return point is the zero position.

In the devices as illustrated and being shown with coinciding zero positions as defined, the operation is independent from the directions of movement with which the oscillator passes through the zero position twice during each cycle; four impelling pulses of correct polarity are produced during each cycle; these pulses are also within the meaning of the rule if one considers, alternatively the return points as zero positions for the rule of the induction.

The invention is not limited to the embodiments described above, for example oscillators using other types of control elements such as Hall-generators, unijunction transistors, etc. can be used. All changes and modifications of the above described embodiments not constituting departments from the spirit and scope of the invention are intended to be covered by the following claims.

I claim:
1. Impelling system for a mechanical oscillator including magnet means oscillating therewith comprising: a stationary driver coil adjacent said oscillator; said magnet means during oscillation of said oscillator having a zero position, a period of approach and a period of receding of said magnet means with respect to said driver coil; position sensing means adjacent said oscillator and responsive to the momentary position of said oscillator during said period of approach and operable for producing an output signal voltage pulse indicative thereof; pulse developing means connected to said sensing means and responsive thereto so as to develop a current pulse upon occurrence of an output signal voltage pulse of said sensing means; and circuit means interconnecting said pulse developing means with said driver coil means and including inductive means operable in response to a pulse developed in said pulse developing means to develop consecutive driving pulses of respectively opposite polarity in said driver coil with the first occurring during said perod of approach of said magnet means and attracting said magnet means and the second occurring during said period of receding of said magnet means and repelling said magnet means.

2. An impelling system according to claim 1 in which said pulse developing means comprising a transistor, said circuit means including the collector-emitter circuit of said transistor, said position sensing means being connected in the base-emitter circuit of said transistor.

3. Impelling system for a mechanical oscillator including magnet means oscillating therewith, comprising: means for producing a voltage pulse of given polarity when the oscillator approaches a preselected zero position; a transistor; variable circuit means connected to said transistor so as to complete an adjustable electronic oscillator; connection means interconnecting said voltage pulse producing means and said electronic oscillator; a driver coil adjacent said oscillator; and means inductively coupling said driver coil to the output circuit of said oscillator for causing said drives coil to produce magnetic impelling pulses for said magnetic means of alternating polarity with an alternation occurring precisely at said zero position of said oscillator.

4. Impelling system for a mechanical oscillator including a permanent magnet and a cam oscillating therewith, comprising: a D.C. voltage source; a switch closeable by said cam; a semi-conductor oscillator having an input circuit; circuit means interconnecting the contacts of said switch, said voltage source and said input circuit; and semi-conductor oscillator produing two current pulses of alternating polarity when said switch is closed; and a driver coil operatively associated with said oscillator so as to be responsive to said two current pulses and developing driving force on said magnet for each pulse.

5. Impelling system for a mechanical oscillator including magnet means oscillating therewith, comprising: means for producing a voltage pulse of given polarity only when the oscillator approaches a preselected zero position; a transistor including circuit means normally biasing the transistor to cutoff the collector current thereof; means connecting the base-emitter path of said transistor to said pulse producing means so that said voltage pulse can overcome the cut-off bias of said transistor; a first driver coil connected to the collector-emitter circuit of said transistor; a second driver coil inductively coupled to said first driver coil; and a resistor connected across the terminals of said second driver coil.

6. Impelling system as set forth in claim 3 said means inductively coupling comprises: a transformer having a primary winding connected in series circuit connection with the collector-emitter path of said transistor; a resistive secondary circuit including a secondary winding of said transformer; and a driver coil connected in series circuit connection with said primary winding and further connected in parallel with said secondary winding for producing magnetic impelling pulses for said magnetic means of alternating polarity with an alternation occurring precisely at said zero position.

7. Impelling system as set forth in claim 6 said inductor means consisting of a choke connected in parallel to said driver coil.

References Cited by the Examiner
UNITED STATES PATENTS

| | | | |
|---|---|---|---|
| 2,909,732 | 10/1959 | Van Overbeek | 331—116 |
| 2,986,683 | 5/1961 | Lavet et al. | 310—36 X |
| 3,084,316 | 4/1963 | Zemla | 318—132 |
| 3,123,755 | 3/1964 | Braithwaite et al. | 310—132 |
| 3,207,965 | 9/1965 | Lavet | 318—130 X |

MILTON O. HIRSHFIELD, *Primary Examiner.*

D. F. DUGGAN, *Assistant Examiner.*